(12) United States Patent
Thill et al.

(10) Patent No.: US 9,141,901 B2
(45) Date of Patent: Sep. 22, 2015

(54) DUAL RANGE RADIOFREQUENCY COMMUNICATION OBJECT AND METHOD FOR IMPLEMENTING SAME

(75) Inventors: Michel Thill, Les Clayes sous Bois (FR); Pierre Gravez, Nogent sur Marne (FR); Matthieu Antoine, Paris (FR)

(73) Assignee: GEMALTO SA, Meudon (FR)

( * ) Notice: Subject to any disclaimer, the term of this patent is extended or adjusted under 35 U.S.C. 154(b) by 141 days.

(21) Appl. No.: 13/638,758

(22) PCT Filed: Mar. 31, 2011

(86) PCT No.: PCT/EP2011/055053
§ 371 (c)(1),
(2), (4) Date: Oct. 1, 2012

(87) PCT Pub. No.: WO2011/121094
PCT Pub. Date: Oct. 6, 2011

(65) Prior Publication Data
US 2013/0029603 A1    Jan. 31, 2013

(30) Foreign Application Priority Data
Apr. 1, 2010  (EP) .................................... 10305340

(51) Int. Cl.
*H04B 7/02*  (2006.01)
*G06K 19/07*  (2006.01)
(Continued)

(52) U.S. Cl.
CPC ...... *G06K 19/0723* (2013.01); *G06K 19/07318* (2013.01); *G06K 19/07767* (2013.01)

(58) Field of Classification Search
CPC ....................................................... H04B 7/02

USPC ........... 455/13.4, 522, 14, 127.1, 41.2, 562.1, 455/575.7; 343/725
See application file for complete search history.

(56) References Cited

U.S. PATENT DOCUMENTS 6,685,096 B1    2/2004  Degrauwe et al.
6,762,722 B2 *  7/2004  Chiang et al. .......... 343/700 MS
(Continued)

FOREIGN PATENT DOCUMENTS

DE    103 17 682 A1    10/2004
EP    1 143 377 A1    10/2001
(Continued)

OTHER PUBLICATIONS

International Search Report (PCT/ISA/210) issued on Jul. 5, 2011, by the European Patent Office as the International Searching Authority for International Application No. PCT/EP2011/055053.
(Continued)

*Primary Examiner* — Minh D Dao
(74) *Attorney, Agent, or Firm* — Buchanan Ingersoll & Rooney PC

(57) ABSTRACT

The present invention relates to a communication object comprising means for radiofrequency communication with a remote device, wherein said communication means are capable of establishing a first short-range communication and a second communication having a longer range than the first communication, said long range being enabled by Bluetooth or Wifi technology. The communication means use the same type of communication technology for the first and second communications. The invention also relates to a method for implementing the dual-range radiofrequency communication of the object.

18 Claims, 3 Drawing Sheets

(51) Int. Cl.
*G06K 19/073* (2006.01)
*G06K 19/077* (2006.01)

(56) References Cited

U.S. PATENT DOCUMENTS

| | | | |
|---|---|---|---|
| 7,068,985 B2 * | 6/2006 | Quilisch et al. | 455/127.2 |
| 7,627,291 B1 * | 12/2009 | James-Roxby et al. | 455/73 |
| 7,642,980 B2 * | 1/2010 | Louzir et al. | 343/767 |
| 7,756,477 B2 * | 7/2010 | Lee | 455/41.2 |
| 8,565,198 B1 * | 10/2013 | Tran et al. | 370/336 |
| 2001/0028302 A1 | 10/2001 | Degrauwe et al. | |
| 2003/0116634 A1 | 6/2003 | Tanaka | |
| 2004/0157559 A1 * | 8/2004 | Sugikawa | 455/41.2 |
| 2006/0068719 A1 * | 3/2006 | Hairapetian | 455/69 |
| 2007/0229278 A1 | 10/2007 | Nagata et al. | |
| 2007/0242736 A1 * | 10/2007 | Proctor et al. | 375/219 |
| 2008/0129622 A1 * | 6/2008 | Freeland et al. | 343/719 |
| 2013/0335280 A1 * | 12/2013 | Chen et al. | 343/725 |
| 2014/0028511 A1 * | 1/2014 | Rao | 343/729 |

FOREIGN PATENT DOCUMENTS

| | | |
|---|---|---|
| EP | 1 760 900 A1 | 3/2007 |
| FR | 2 779 847 A1 | 12/1999 |

OTHER PUBLICATIONS

Written Opinion (PCT/ISA/237) issued on Jul. 5, 2011, by the European Patent Office as the International Searching Authority for International Application No. PCT/EP2011/055053.

* cited by examiner

DUAL RANGE RADIOFREQUENCY COMMUNICATION OBJECT AND METHOD FOR IMPLEMENTING SAME

The present invention relates to a dual range radiofrequency communication object and method for implementing same.

More particularly, the invention relates to a communication object comprising means for radiofrequency communication with a remote device, wherein said communication means are capable of establishing a first short-range communication CP and a second communication LP having a longer range than the first communication.

The invention finds a non limiting application, more particularly in an object or a badge-holder including an integrated circuit card interface and giving a secure access to equipment or services through such equipment. The invention preferably finds an application in the establishment of a Bluetooth communication or an equivalent with a remote device. The communicating authentication badge device shall be considered as an example, in order to demonstrate the nature of the invention. However, any other device, which is self-contained and has a radiofrequency communication interface, shall be liable to implement the invention described hereinunder.

The invention more particularly relates to radiofrequency communication devices enabling connections to computer devices. If several users of equipment/terminals PC, portable telephones, printers, etc. are in the same environment, wherein the distance between the terminals is shorter than the radiofrequency field, more particularly that of the Bluetooth technology, communication disturbances occur because of the proximity of the various terminals accessible by the final user.

Therefore, a need exists for a solution to solve the problems of disturbances in communications, more particularly in such an environment wherein multiple users will try to connect to various pieces of equipment.

Among the existing solutions of the state of the art, a device is known which includes a communicating authentication badge enabling a user to authenticate him/herself with a remote computer system (personal computer, portable telephone, personal digital assistant, etc.). A prior proximity exchange between the badge-holder and a computer terminal makes it possible to clearly identify the terminal chosen by the final user and to establish a specific or even a secure communication, without any disturbance. Such short-range matching means make it possible to avoid radiofrequency disturbances related to the use of the same computer equipment by several users.

A first proximity radiofrequency technology called NFC (having a range of approximately 50 cm) is currently used for initiating the connection between the communicating authentication badge and the remote computer system and then the communication goes on through another radiofrequency communication interface based on a different technology from the first one, more particularly the Bluetooth one. Bluetooth chips are currently provided with two ports, one for a Bluetooth communication and the other one for a NFC communication.

However, few computer systems are currently initially equipped with the ISO/IEC 14443 technology and the addition of an external contactless player or adapter then becomes necessary via more particularly a USB connection connected to the computer system in order to create such ISO/IEC 14443 contactless interface and take advantage of the above-mentioned solution on a large scale.

The problem to be solved then consists in finding an equivalent solution which can be broadcast on a large scale, without any modification of the computer equipment or addition of a short-range radiofrequency adapter.

The principle of the invention consists in implementing a initialization/matching phase, not using the contactless technology, in particular the ISO/IEC 14443, but through a radiofrequency communication technology identical to the one used, more particularly the Bluetooth one, after the initialization/matching step, for exchanging between the communicating object and the remote computer device or equipment.

In other words, the invention provides to use only one physical radiofrequency communication interface for the initialization/matching phases of the connection and the communication proper, but by creating a short-range communication of the same nature for the initialization/matching phase.

The present invention thus relates to a communication object comprising means for radiofrequency communication with a remote device, wherein said communication means are capable of establishing a first short-range communication CP and a second communication LP having a longer range than the first communication, said long range being enabled by Bluetooth or Wifi technology. The object is characterized in that the communication means use the same type of communication technology for the first and second communications CP, LP.

According to other characteristics, the object includes:

means for configuring communication able to implement a short-range communication CP further to a disconnected status of long range communication LP;

means for configuring communication able to implement a long range communication LP further to a status connected short-range communication CP;

a first antenna for the first communication CP and a second distinct antenna belonging to the same type of technology for the second communication LP, with said first antenna being so configured as to enable a degraded range CP, when emitting or receiving, relative to the one enabled by the second antenna LP.

The means for configuring communication include an electronic means for attenuating the signal range which can be activated or active further to a disconnected status of the communication and deactivated or inactive further to a connected status of the communication.

The object of the invention is also a method enabling to establish a radiofrequency communication LP between a communication object and a remote device T, wherein a first short-range communication CP is established prior to a second communication LP having a longer range than the first communication CP, said long range being enabled by Bluetooth or Wifi technology. The method is characterized in that the first and second communications CP, LP use the communication means based on the same type of communication technology.

According to other characteristics, the first short-range communication is established by implementing a means for attenuating the signal range, when emitting or receiving.

Other particularities and advantages of the invention will appear when reading the following exemplary description and referring to the appended drawings, wherein.

DETAILED DESCRIPTION OF THE INVENTION

Detailed description of a concrete example.

Figure 1:
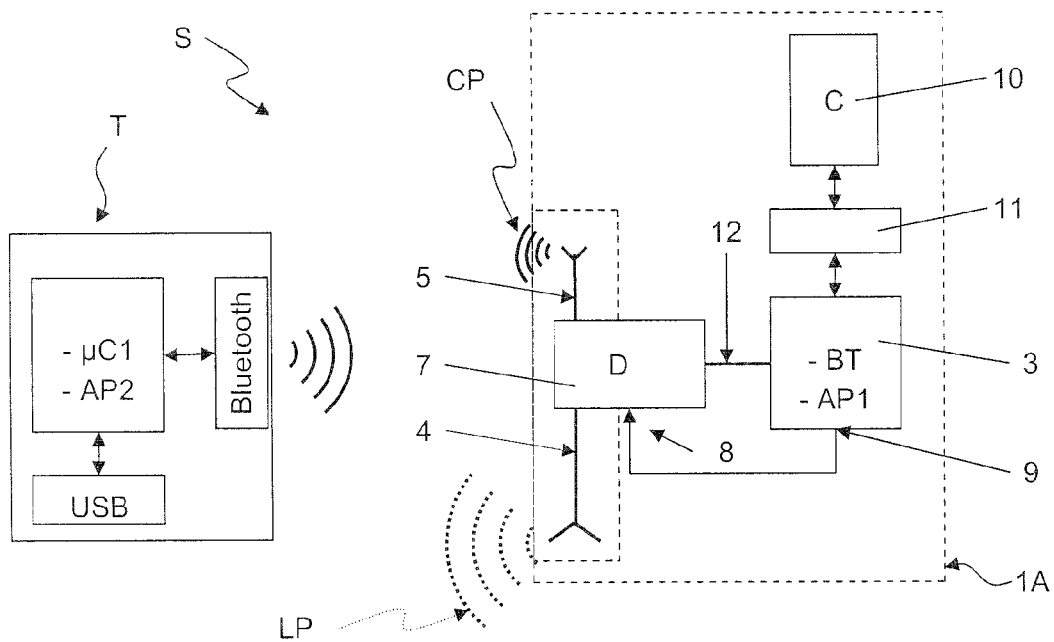
FIG. 1 is a view of a communication system including a communication object according to a first embodiment of the invention.

FIG. 1 illustrates a system according to a first embodiment of the invention and including a portable object 1A in relation with a remote device T.

According to this embodiment, the communication object includes radiofrequency communication means for communicating with the remote device. Such communication means are, in general, capable of establishing a first short-range communication CP and a second communication LP having a longer range than the first communication.

In the example, the communication object is a badge-holder 1A including a ISO 7816 interface with a badge having the shape of an electronic chip card 10, C. The badge holder includes at least one Bluetooth communication means BT, 3. It may also include a microcontroller including a built-in Bluetooth communication module. The communication means BT is connected to at least one physical interface including an antenna 4 and is more particularly intended for establishing a communication with a device represented here by a terminal T such as a computer and/or a printer. Such terminal also includes corresponding means of Bluetooth communication and interface μC1. The object includes here an ISO 7816 interface or a protocol translator 11 between the communication means BT, 3 and the chip card 10, C. Other interfaces are however possible with any peripheral device.

Although the communication is, in fact of the Bluetooth type, it could be any other one, such as Wifi.

The communication aims here at authorizing the utilisation of all or part of the functions of the computer and/or the printer. The communication is for instance a session of identification/authentication and/or presence of a right more particularly in the badge of a user which enables the possibly shared utilisation of the terminal (T).

According to one characteristic of such first embodiment, the communication means use the same type of communication technology for the first and the second communications. In the example, the Bluetooth communication is used for implementing the initialization/matching phase and for exchanging then between the communicating object 1A and the remote device T. Only one physical interface for radiofrequency communication is used for the initialization/matching phases and the communication proper, but a communication having a shorter range and the same nature for the initialization/matching phase is also created.

According to one characteristic of this embodiment, the object includes a radiofrequency communication component capable of delivering an item of information relative to a respectively connected or not connected status of the communication. In the example, the Bluetooth chip 3 provides to deliver an item of information (or a signal) relative to the connected or not connected status thereof, in a port 9, for instance of the GPIO type. If need be, the Bluetooth radiofrequency communication component accepts a software modification making it possible to obtain the connection status on the general purpose input/output 9 of the component.

According to one characteristic of such embodiment, the object includes means for configuring communication capable of implementing a short-range communication CP further to a disconnected status of a long-range communication LP. The object further includes means for configuring communication capable of implementing a long range communication LP and, if need be, the holding on thereof further to a connected status or phase of a short-range communication CP.

In the example, the means for configuring communication 3, 4, 5, 7 include a first antenna 5 for the first communication and a second distinct antenna 4 belonging to the same type of technology for the second communication. The first antenna is so configured as to offer a degraded range (short-range CP) with respect to the second antenna, for instance a range shorter than or equal to approximately 50 cm. In the example, the antenna used for the communication after the connection is established, is an antenna having characteristics similar to those existing in the current devices. The range is for example from 10 to 100 m. The two antennas 4, 5 are connected to the Bluetooth chip 3 through a link 12.

According to one characteristic of this embodiment, the first antenna has proper characteristics which only authorize a first communication having a range shorter than the one authorized with the second antenna. The first antenna is a less efficient version of the second one, with the word efficient meaning the possibility for the antenna to emit or receive at a longer or shorter distance in space, with the same reference energy.

The first antenna is of the PIFA (Printed Inverted F Antenna) type or of the built-in type. Its range is only 50 cm. Contrary to the prior art wherein the second Bluetooth communication is possible after a radiofrequency communication of the ISO/IEC 14443 type via a corresponding antenna, the invention uses the same communication type for the first and the second communications CP, LP.

The means for configuring communication also include means for selecting the antenna. Here, this means is an antenna duplexer D, 7 positioned between the antennas and the Bluetooth chip. The duplexer selects one of the two antennas depending on a control signal occurring on one of the inputs 8 thereof. Such duplexer may include components of the PIN (Positive Intrinsic Negative) diode type. The duplexer may include a 2- or even 3-position switch corresponding, respectively to the selection of the antenna 5, the selection of the antenna 4, or if need be, a neutral position. The Bluetooth signals come from the Bluetooth controller 3 via the link 12 with the duplexer D.

The means for configuring communication may also include means for the automatic control of the selection of the antennas. In the example, as the Bluetooth microcontroller 3 is capable of determining the (connected, not connected) status of the communication and of emitting a signal (or an item of information) representative of such status or informing the outside of the status of the connection, the invention provides the utilisation of such item of information for automatically selecting one of the two antennas. The signal may also be a polarity or voltage level on an output 9 or the microcontroller BT. The outside may for instance be an IHM interface with the user, an external block 9.

The control signal (or information) is then directed toward the means for selecting the antenna via the link between 8 and 9. The signal brought by the microcontroller to the selection means makes it possible to control the selection or to select the appropriate antenna according to the session to be implemented (pre-established initialization/matching/reconnection after initialization/matching) and/or according to the current connection.

The portable object, in the example, includes means for implementing a step of initialization or matching between the portable object and the terminal. Such step makes it possible to secure the subsequent communication and/or to avoid disturbances with other surrounding communications. The matching consists in an exchange of secrets, enciphering key, or identifier between the portable object and the terminal so as to subsequently exchange in a coded way or for recognizing and authorizing the utilisation of the terminal. Such step is here implemented through a matching/initialization programme or application AP1 contained in a programmable memory of the microcontroller, more particularly Bluetooth BT, 3 or other radiofrequency technologies. On the other hand, the remote terminal contains a corresponding software programme or application AP2 in a microcontroller µC1.

The initial phase is then executed during the very first connection, or preferably upon each new connection as a preliminary stage for a long range main communication. If need be, a test makes it possible to know whether the connection is the very first one or to know whether a prior initialization has been favourable executed beforehand. If so, a new communication with a remote device known to the object can be directly established with the long range antenna according to an alternative operation antenna, which makes it possible to save time and to avoid placing the object closer to the remote device in order to create a short range communication.

Figure 2:
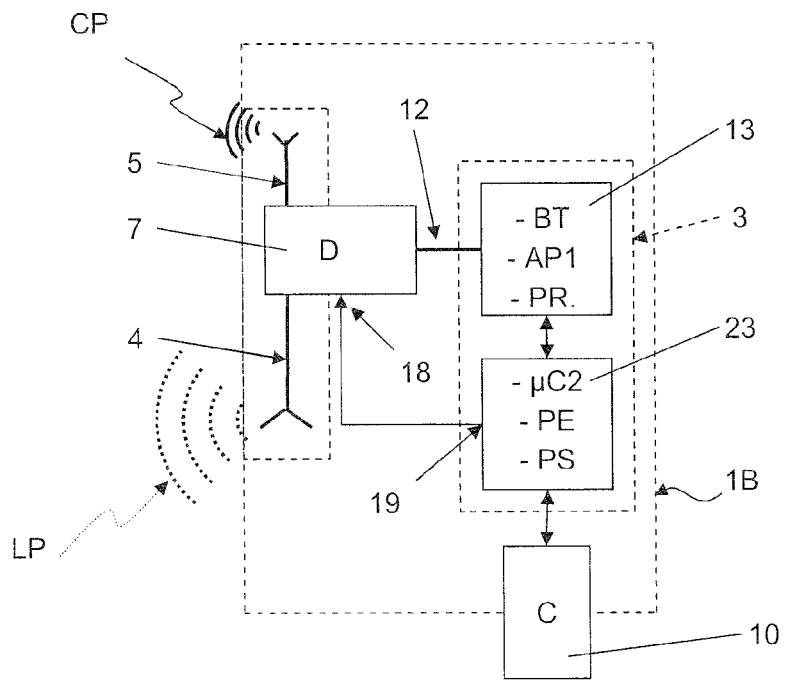
FIG. 2 is a view of a communication object according to a second embodiment of the invention.

In FIG. 2, the portable object corresponds to a second embodiment of the invention. It includes the same elements as those in FIG. 1, with the same reference numbers indicating the same means except, however, for the fact that it includes a communication controller 33. This controller includes a part for processing the signal such as a Bluetooth chip 13 and a part which is a communication controller, such as a microcontroller µC2, 23, different from the Bluetooth controller 13, so arranged as to communicate with the Bluetooth chip. The controller part 23 may preferably include an interface with the chip card 10 in the badge-holder application, for example, or with any other peripheral device.

The communication controller 23 also includes an interface 19 linked with an input 18 of the means for selecting short and long range communications, in order to control these. Such means are the duplexer 7, as before. If need be, the microcontroller may directly decide what the status of the selection means is.

Such microcontroller 23 or µC2 has a control input/output port 19 linked to the duplexer 7, so as to select the antenna, as before. According to this embodiment, the Bluetooth chip 13 delivers a signal or an item of information on the status of the Bluetooth connection to the microcontroller 23. The microcontroller 23 may include a software application PE intended to check the status of the connection at regular or predetermined intervals. For example, the microcontroller µC2 sends a command for reading the status of the connection in a status register RE, which is permanently informed by the Bluetooth chip.

According to an alternative solution, at regular or predetermined intervals the Bluetooth chip BT contains a programme PR capable of informing or warning the outside (IHM, screen, sound signal, etc.) of the instant status of the Bluetooth connection or of each status change. The microcontroller 23 can examine the signals it receives from the Bluetooth chip on a common interface point.

The communication controller 23 may include a programme PS intended to control the selection of antennas as a function of the information, more particular about the connection/disconnection, received from the Bluetooth chip.

Figure 5:
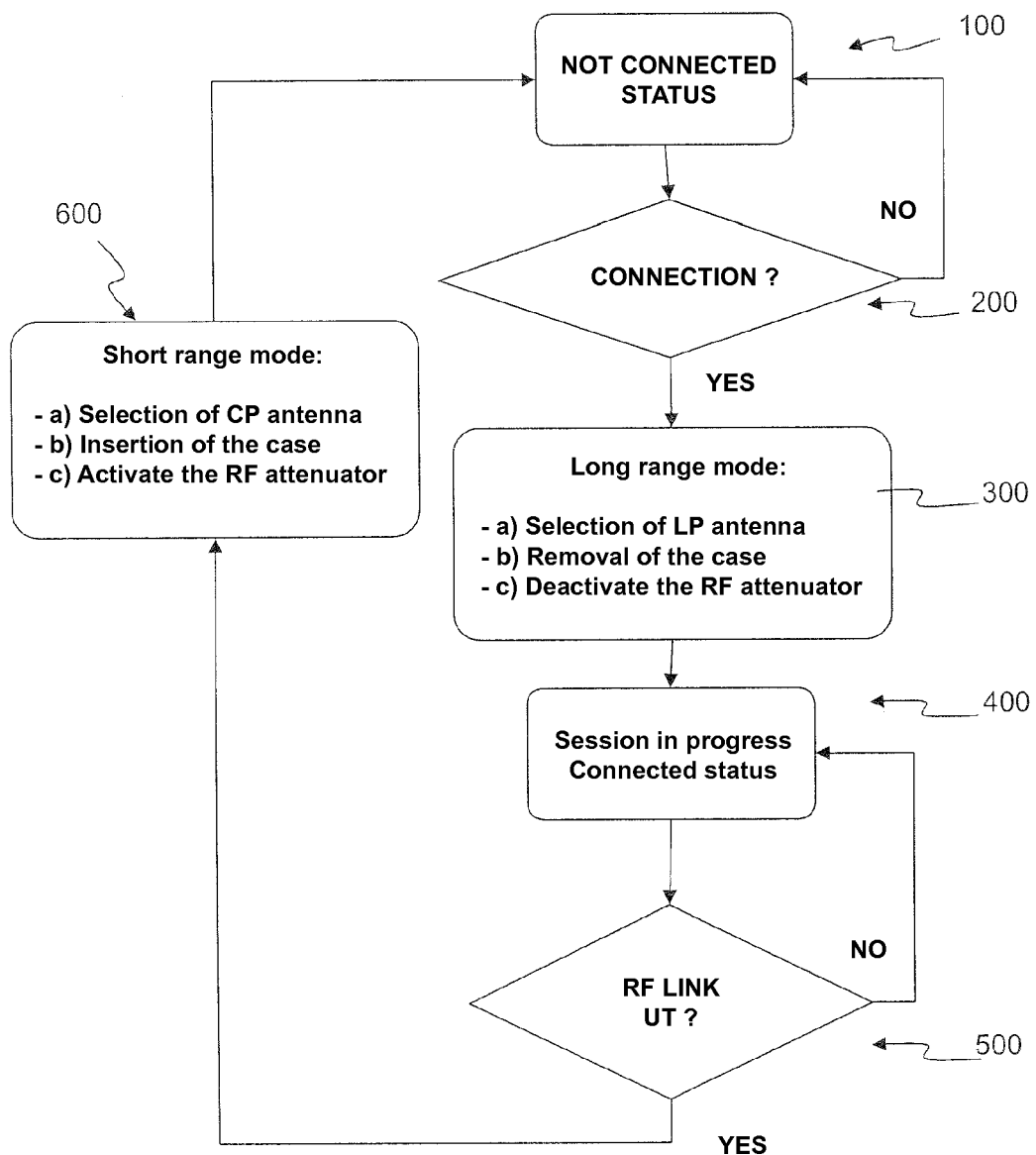
FIG. 5 illustrates steps of the method of the invention for implementing the above objects.

The flowchart in FIG. 5 describes the operation of the radiofrequency communication objects implementing the invention. The steps 300 and 600 include sections a, b, c specific respectively to the objects in FIGS. 1, 2 together, then 3 and 4.

In step 100, a user wishing to use a printer T (or a more appropriate PC), shows his/her badge-holder 1A close to the printer T (within 50 cm). When the object is powered on, the duplexer switches to a status making it possible to select the degraded antenna 5. The object is previously in a non connected status or in a status awaiting a request for connection. In a non connected status, the antenna selected by default (or switched into a not connected status) is thus the antenna 5 which enables a communication with a shorter range. As long as no connection is established, the portable object remains in this configuration.

In step 200, when the object 1A has established the initialization and/or matching and/or authentication and/or identification phase and gets connected (if this connection status continues) whereas the Bluetooth controller BT which has detected this connection status by a test, transmits a corresponding signal S on the port 9. In the case of a non connection, the flowchart of FIG. 5 closes the loop at the previous step 100.

In step 300, the signal S reaches the duplexer 7 and causes the selection of the long range antenna LP. According to an alternative solution, in response to the detection of the connected status, or when it is connected, the Bluetooth controller may emit an analog or a logic signal having a polarity different from the previous one, or having a different 0 or 1 logical level on the outlet port 9 (GPIO, General Purpose Input Output) thereof. The signal S received by the duplexer on the input 8 thereof, causes the selection of the main antenna LP 4, which thus enables a dialogue having a longer range LP than the previous communication.

In step 400, the object 1A remains in this current session configuration (in a connected status), as long as the communication is not cut, willingly (powering off of the object 1A or powering off of the PC, etc.) or not (too important a distance between the PC and the object 1A).

In step 500, if the radiofrequency link RF is not cut, the session continues. If it is (radiofrequency link RF cut), the Bluetooth chip detects a disconnection status and generates a signal representing such status toward the duplexer 7 in order to cause, in step 600 the selection of the degraded antenna 5, for the next connection and/or initialization.

The operation of the embodiment 2 has now been explained. The steps 100 and 200 are executed as before.

In step 300, if the connection is effective, the microcontroller 23 connected to the Bluetooth chip 13, receives the item of information on the connection status "connected" and triggers a selection of the antenna 5 by emitting a command signal toward the duplexer according to an internal application for selecting antennas PS.

For this purpose, according to one embodiment, the microcontroller can check at regular or predetermined intervals the Bluetooth chip operating, for example, as a slave chip of the master microcontroller, through a command to read in a status register RE of the Bluetooth chip BT by executing an internal application PE. Managing such functionality with an interruption is also possible. According to an alternative solution, the microcontroller may stay tuned to the signals emitted by the Bluetooth chip representing the connection status thereof and appearing on an interface common with the Bluetooth chip.

The step 400 can be executed as in FIG. 1. In step 500, when the RF link is cut, the microcontroller 23 receives a corresponding item of information from the Bluetooth chip (preferably a logic signal or an item of information), and the item of information can be obtained, as for the previous three ones, by a command to read, by an interruption or by checking the signals from the Bluetooth chip reaching an interface common with the microcontroller. In response, the microcontroller 23 emits a command signal toward the means for selecting the antenna to select the degraded antenna 5 or to place it in a neutral position.

Figure 3:
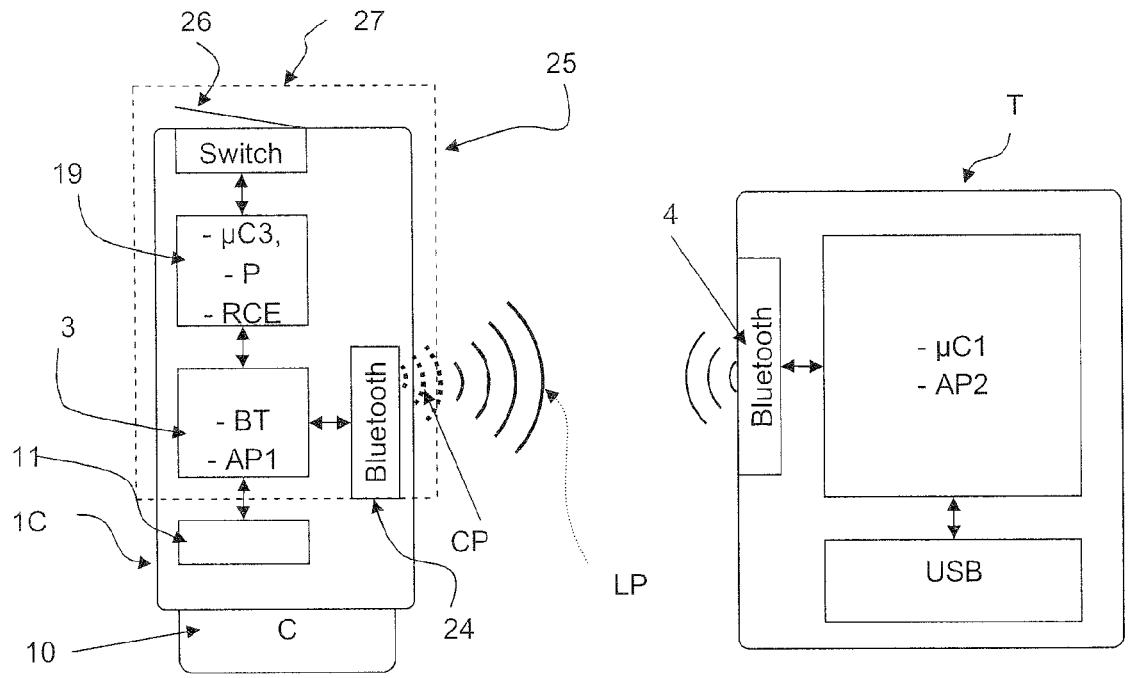
FIG. 3 is a view of a communication object according to a third embodiment of the invention.

In FIG. 3, a third embodiment includes a case 25, a housing or an equivalent means capable of receiving or hiding at least partially a portable object. The object here includes only one radiofrequency physical interface and a Bluetooth chip BT, 3. The interface 24 includes only one antenna of the same type LP as the antenna 4 of FIG. 1. The portable object may include a microcontroller μC3 for controlling the Bluetooth chip and executing other functions of the portable object, by virtue of an application P controlling a peripheral device and/or the behaviour of the object, as explained hereinafter. A priori, the object may be any electronic portable device such as an earpiece, a mouse, a removable hard disk, a personal assistant PDA, a digital picture frame, etc.

The object includes a protocol translator 11, like in FIG. 1. According to one characteristic of the invention, the means enabling a short range communication include an electromagnetic shutter or field screen. In order to establish the initialization phase, the shutter must be so positioned as to limit the range, at least opposite the antenna, or, preferably around it.

According to a preferred embodiment, the shutter or absorber 25 is an envelope or a case which can be a cover or a case for receiving the portable object. The object also includes means for detecting the insertion of the object in the case. For example, this detection means is provided with a switch 26 which closes a circuit when the object is introduced right down the case by interaction with a bottom wall 27 of the case. Any other known means for detecting the insertion can be provided such as an optical sensor, a position limit sensor, etc. The sensor or the switch is linked to the microcontroller μC3 to inform it of the status thereof.

The communication configuration means here include a means for attenuating 25 the signal range which includes a material absorbing the radiofrequency field and which is so arranged as to be a partial obstacle to the radiofrequency field further to a disconnected communication status.

The object is operated as follows.

In order to establish a connection, the user introduces the powered object 1C into the case 25. The switch 26 (or a position sensor) at the end of the object is actuated when the object reaches the bottom of the case and a signal indicating an inserted position is recovered by the microcontroller μC3 through the activation of the switch.

Then, in response to the inserted position signal, the microcontroller μC3 triggers the step of initialization (or authorizes the Bluetooth chip to establish it) through the single antenna. According to an alternative solution, the authorization can be given by a signal from the microcontroller μC3 controlling the Bluetooth chip. It can also be a command to supply the Bluetooth chip or equivalent from the microcontroller μC3.

Thanks to the case-shaped shutter, the communication is attenuated to become a short-range CP one, when emitting as well as when receiving, for example at a distance of 50 cm or 1 m. The material used in the cover to act as a screen or attenuate the range is of a metallic type.

When the connection is established after the initialization/identification phase, the Bluetooth chip emits a corresponding signal onto an output 19 of the GPIO type. According to an alternative solution, the microcontroller μC3 can receive an item of information about a connected status as previously described for FIG. 2. Such signal (or item of information) can be retransmitted thanks to the application P in order to inform the user that the connection has been established and that he/she can take his/her object out of the case in order to increase the communication range. Once the object is in a connected status and the case has been removed, the long range communication is established and is not cut when the switch is released.

Further to a disconnection, the Bluetooth chip BT informs the outside, and more particularly the microcontroller μC3 of its status. Such microcontroller μC3 can inform a status register RCE in an internal memory of the disconnection status. By virtue of the execution of the application P, the microcontroller authorizes a new connection with a new terminal only if a new introduction of the object into the case has been detected after receiving an inserted position signal, as beforehand.

However, in the case where a new connection must be established with the same terminal as the one on which a step of initialization has already been executed beforehand, the invention may provide that the object can be connected as soon as it is within the normal range LP of the terminal after a simple phase of reciprocal recognition, using, for example the identifier of an object and the identifier of a terminal, without having to use the case.

Figure 4:
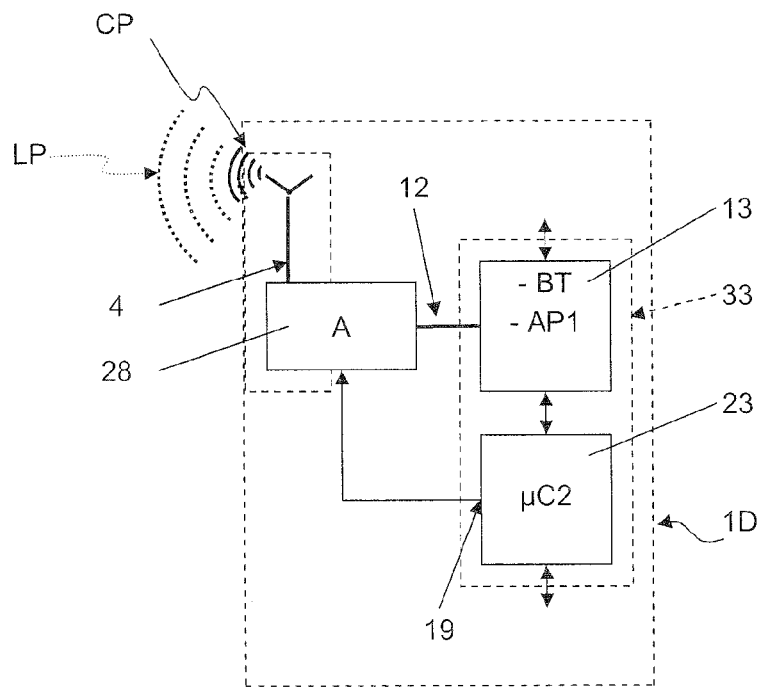
FIG. 4 is a view of a communication object according to a fourth embodiment of the invention.

FIG. 4 illustrates two other embodiments of the communication object 1C substantially corresponding those in FIG. 2, or even FIG. 1, but with an attenuator A being substituted for a duplexer D and with only one normal antenna of the long range type 4.

The command signals from the configuration means 33 or more particularly from the Bluetooth chip BT, 13 or the microcontroller μC2 and which were intended for selecting one of the two antennas in FIG. 2 or 1, are used here for electronically activating or deactivating the radiofrequency field attenuator A. The attenuator is an electronic component reacting to an input 18. It is provided with two accesses. In the embodiment of FIG. 4, one access is connected to the Bluetooth chip 13 and the other access is connected to the antenna 4. The input 18 makes it possible to select whether the signal going through the attenuator 28 must be attenuated or not, whatever the direction of the signal (from the antenna 4 toward the Bluetooth chip 13, or reversely). One exemplary attenuator is supplied, in particular, by the M/A-COM Inc. (Tyco Electronics) company, with reference no AT-255 V7.

As compared to the operation of the invention of FIG. 2, or even FIG. 1, in step 300, when the signal was intended to select the long range antenna 4 or to establish a long range communication LP, in the case of the object of FIG. 4, the same signal causes a deactivation of the attenuator effect.

On the contrary, when the signal was intended to select the short-range antenna 5 in step 600, or to establish a short range communication CP, in the object of FIG. 4, the same signal activates the attenuation.

If need be, the invention may provide for an operation wherein, if matching has already been executed previously, the connection can be directly established as a long range one. For this purpose, either the user forces the long range communication through a direct manual selection, or the object carries out a test in response to the interrogation relative to the existence of a previous matching. In this favourable case, the object attempts to establish a connection with the same previous parameters or identifier and/or session key directly by implementing a long range; if the connection fails, a message of error is emitted and the user must bring the object closer to the remote device and start the initialization phase.

The invention claimed is:

1. A communication object comprising means for radiofrequency communication with a remote device, wherein said communication means establishes a first short-range communication with the remote device, and subsequently establishes a second communication with the remote device having a longer range than the first communication, said long range being enabled by Bluetooth or Wifi technology,
 wherein the communication means use the same type of communication technology for the first and second communications and
 wherein the communication object includes a first antenna for the first communication and a second distinct antenna belonging to the same type of technology for the second communication.

2. A communication object according to claim 1, further comprising a radiofrequency communication component capable of issuing an item of information relative to a respectively connected or disconnected status of the communication.

3. A communication object according to claim 2, further comprising means for configuring the communication means to implement a short-range communication in response to a disconnected status of the communication.

4. A communication object according claim 3, further comprising means for configuring the communication means to implement a long-range communication and to hold the communication further in response to a connected status of the communication.

5. A communication object according to claim 3, wherein the configuration means include a selection means for selecting a first antenna further to a disconnected status of the communication and selecting a second antenna further to a connected status of the communication.

6. A communication object according to claim 5, wherein said selection means includes a duplexer.

7. A communication object according to claim 6, wherein the type of each antenna is adapted to a Bluetooth communication.

8. A communication object according to claim 7, wherein the second antenna is of the PIFA type or of the built-in type.

9. A communication object according to claim 3, wherein the means for configuring communication include an electronic means for attenuating the signal range, with said attenuation means being configured to be activated further to a disconnected status of the communication and deactivated further to a connected status of the communication.

10. A communication object according to claim 3, wherein the means for configuring communication include an electronic means for attenuating the signal range including a material absorbing the radiofrequency field and so arranged as to be a partial obstacle to the radiofrequency field further to a disconnected status of the communication.

11. A communication object according to claim 1, wherein said first antenna is configured as to enable a degraded range relative to the one enabled by the second antenna.

12. A communication object according to claim 11, wherein the first antenna has characteristics which enable only a communication having a shorter range than the one enabled by the second antenna.

13. A communication object according to claim 1, wherein the communication means switches to the second communication in response to the first communication having been established with the remote device.

14. A method for implementing a radiofrequency communication between a communication object and a remote device, wherein a first short-range communication is established with the remote device prior to a second communication established with the remote device having a longer range than the first communication, said long range being enabled by Bluetooth or Wifi technology,
 wherein the first and second communications are established by communication means of the same type of communication technology, and
 wherein a first antenna is used for the first communication and a second distinct antenna belonging to the same type of technology is used for the second communication.

15. A method according to claim 14, further including a step of implementing a short-range communication further to a disconnected status of long-range communication.

16. A method according to claim 14, further including a step of implementing a long range communication further to a connected status of short range communication.

17. A method according to claim 14, wherein the first short range communication is established by implementing a means for attenuating the signal range.

18. A communication object comprising means for radiofrequency communication with a remote device, wherein said communication means establishes a first short-range communication for initialization and/or pairing to enable a second communication of longer range than the first communication to be established,
 wherein the communication means uses the same type of communication technology for the first and second communications, and
 wherein the communication object includes a first antenna for the first communication and a second distinct antenna belonging to the same type of technology for the second communication.

* * * * *